United States Patent
Milo

[11] 3,780,585
[45] Dec. 25, 1973

[54] CRYOGEN TEMPERATURE INDICATOR

[75] Inventor: William C. Milo, Anaheim, Calif.

[73] Assignee: The United States of America as represented by the Secretary of the Army, Washington, D.C.

[22] Filed: Jan. 12, 1972

[21] Appl. No.: 217,356

[52] U.S. Cl................ 73/362 SC, 307/310, 330/23
[51] Int. Cl. ....... G01k 7/24, G01k 1/20, H03f 1/30
[58] Field of Search................ 73/362 SC; 307/310; 330/23

[56] References Cited
UNITED STATES PATENTS

| | | |
|---|---|---|
| 3,260,115 | 7/1966 | Logan .......................... 73/362 SC |
| 3,092,998 | 6/1963 | Barton .......................... 307/310 X |
| 3,440,883 | 4/1969 | Lightner........................ 73/362 SC |
| 3,473,385 | 10/1969 | Kiichi Komatsubara ......... 73/362 A |
| 3,571,735 | 3/1971 | Ducamus......................... 330/23 X |
| 3,603,150 | 9/1971 | Kurtin............................ 73/362 SC |

OTHER PUBLICATIONS (S0201-0046) Huen, T. Semiconductor Divide Low Temperature Thermometer. In Review of Scientific Instruments. Vol. 41, No. 9: pp. 1368-9. (Sept. 1970). (L 7250-0006). Regulador de Temperature. In Revista Telegrafica Electronica, Oct., 1971: p. 590. TK-4 -R59.

Primary Examiner—Donald O. Woodiel
Assistant Examiner—Frederick Shoon
Attorney—Charles K. Wright et al.

[57] ABSTRACT

A diode, which will vary its voltage in response to a variance in temperature, is housed in a heat sink. The heat sink is placed into a cryogenic material whose temperature is to be measured. The voltage across the diode is indirectly measured so as to give an indication of the temperature of the cryogen.

1 Claim, 1 Drawing Figure

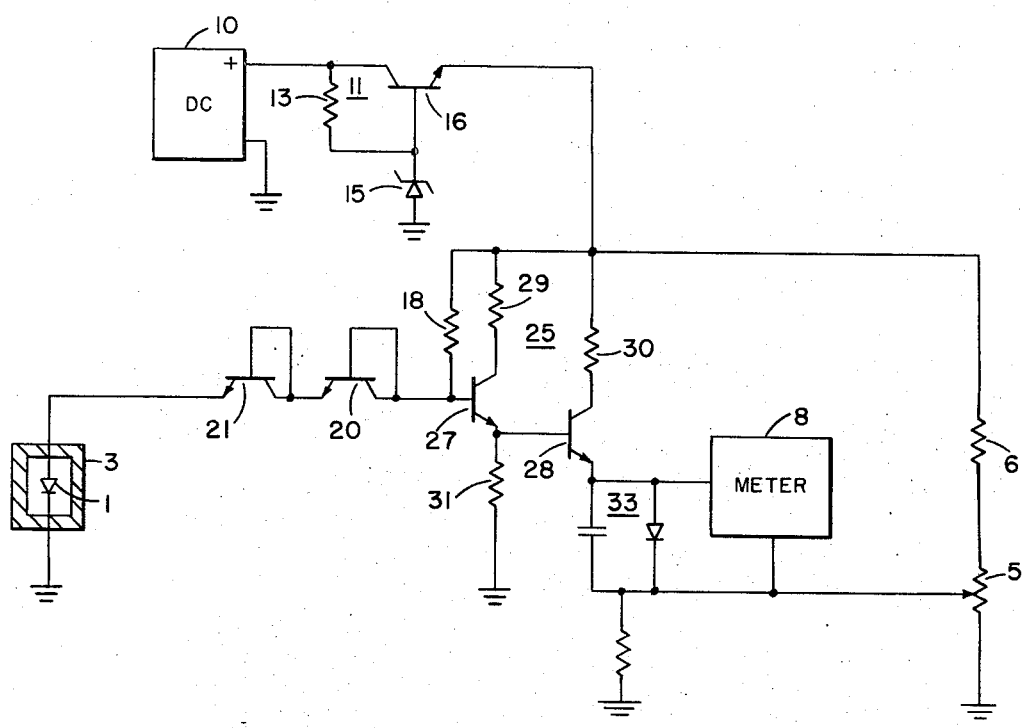

CRYOGEN TEMPERATURE INDICATOR

BACKGROUND OF THE INVENTION

This invention is related to the field of temperature measurement. More particularly this invention is related to the field of cryogenic temperature measurements. Prior art devices for measuring cryogenic temperatures required a high cost, and the packaging was bulky. None of prior art devices lent itself to be packaged in a microcircuit or in a small meter panel.

SUMMARY OF THE INVENTION

This invention utilizes the voltage change across a diode due to a change in temperature. The diode is located in a heat sink which is subjected to the temperature desired to be measured (such as the temperature of a cryogen). The change in the temperature of the heat sink will cause the temperature of the diode to vary with it. A source of d-c voltage is regulated to a constant value and supplies current through a resistor to the diode. As the voltage across the diode varies due to temperature changes, the voltage across the resistor will also vary. An amplifier is connected across the resistor so as to sense change in the voltage of the resistor. This amplifier feeds a meter circuit which is calibrated in degrees kelvin so as to directly read the temperature of the cryogen. The amplifier is made up of two ganged transistors. Two series transistors are provided in the diode circuit for ambient temperature compensation.

BRIEF DESCRIPTION OF THE DRAWING

The single FIGURE is a schematic showing of the preferred embodiment of the invention.

DESCRIPTION OF THE PREFERRED EMBODIMENT

A diode 1, such as a silicon diode or any of the diodes which will vary their voltage in response to temperature, is housed in a heat sink 3 which is shown partially cut away. Heat sink 3 can take any of the known forms, such as a probe form. The diode 1 will vary at a value of 2.5 millivolts per degree kelvin or centigrade change. The preferred embodiment illustrated has a range of 100° kelvin. The location in the temperature scale of the range is set by the trim pot 5 in correspondence with resistor 6. A common range for measuring cryogenic materials is in the range of 177° kelvin to 77° kelvin. Meter 8 may be any of the well known meters, such as a phaostron prestige II, 1 ma movement meter. Meter 8 can be calibrated by placing the diode 1 in boiling liquid nitrogen and varying the trim pot until 77° kelvin is full scale.

A d-c voltage source 10 is regulated to a constant value by voltage regulator 11. Voltage regulator 11 is made up resistor 13, zenor diode 15 and transistor 16. Voltage regulator is well known in the art and will provide an output at the emitter of transistor 16 which is a constant voltage, as long as d-c voltage source 10 is within a certain voltage range. A large resistor 18 is connected in series with transistors 20 and 21. Voltage source 10 will feed current to diode 1 by way of regulator 11, resistor 18, and transistors 20 and 21. As the voltage across diode 1 changes due to change in temperature, the current flow through diode 1 will change; therefore, causing the voltage across resistor 18 to vary in accordance with the temperature variance. An amplifier circuit 25 is provided to sense the voltage change across resistor 18. Amplifier 25 consist of transistors 27 and 28 which are ganged together by way of resistors 29, 30 and 31. The output amplifier 25 is fed to meter 8 by way of filter 33; therefore meter 8 senses the voltage across amplifier 25 which in turn senses the voltage across 18 which in turn is proportional to the voltage across diode 1. From all this, it can be seen that meter 8 will sense the temperature of heat sink 3 which is subjected to the temperature desired to be measured. With proper calibration meter 8 will therefore read the temperature desired.

Transistors 27 and 28 will change their impedance due to ambient temperature changes. In order to compensate for this transistors 20 and 21 are provided in the diode side of the circuit and subjected to the same ambient temperature so as to balance any impedance changes in transistors 27 and 28 by corresponding change in impedance by transistors 20 and 21. Transistors 20 and 21 have their collectors connected directly to their bases so as to keep transistor 20 and 21 in an on condition. All of the resistors and the trim pot of the system are temperature stable components.

I claim:

1. A temperature measuring circuit comprising a source of dc voltages; a regulator connected across said source of dc voltages so as to regulate its output to a constant voltage; a resistor; first and second transistors each having its base connected to its own collector; a silicon diode; said source of dc voltages, resistor, first and second transistors, and said diode being connected in a series circuit; heat sink means inclosing said silicon diode; said heat sink and diode being placed in the vicinity of the temperature to be measured; a third transistor having its input connected across said resistor means; a fourth transistor having an input connected to the output of said third transistor whereby said transistors are ganged together; measuring means connected to the output of said fourth transistor so as to measure the temperature; and said first and second transistors compensating for changes in the operation of said third and fourth transistors due to temperature.

* * * * *